United States Patent
Reddy et al.

(10) Patent No.: US 10,439,456 B2
(45) Date of Patent: Oct. 8, 2019

(54) SLEEVE ROTOR SYNCHRONOUS RELUCTANCE ELECTRIC MACHINE

(71) Applicant: General Electric Company, Schenectady, NY (US)

(72) Inventors: Patel Bhageerath Reddy, Niskayuna, NY (US); Kevin Michael Grace, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 278 days.

(21) Appl. No.: 15/367,261

(22) Filed: Dec. 2, 2016

(65) Prior Publication Data

US 2017/0310171 A1   Oct. 26, 2017

Related U.S. Application Data

(60) Provisional application No. 62/327,043, filed on Apr. 25, 2016.

(51) Int. Cl.
| | |
|---|---|
| *H02K 1/24* | (2006.01) |
| *B60L 11/18* | (2006.01) |
| *H02K 1/14* | (2006.01) |
| *H02K 3/18* | (2006.01) |
| *H02K 19/10* | (2006.01) |

(52) U.S. Cl.
CPC ............ *H02K 1/246* (2013.01); *B60L 11/18* (2013.01); *H02K 1/146* (2013.01); *H02K 3/18* (2013.01); *H02K 19/103* (2013.01); *H02K 2201/03* (2013.01); *H02K 2213/03* (2013.01)

(58) Field of Classification Search
CPC .......... H02K 1/246; H02K 1/146; H02K 3/18; H02K 19/103; H02K 2201/03; H02K 2213/03; B60L 11/18
See application file for complete search history.

(56) References Cited

U.S. PATENT DOCUMENTS

| | | | | |
|---|---|---|---|---|
| 4,368,418 A | * | 1/1983 | Demello | .............. H02J 3/16 |
| | | | | 174/DIG. 17 |
| 5,256,924 A | | 10/1993 | Fischer | |

(Continued)

FOREIGN PATENT DOCUMENTS

| | | |
|---|---|---|
| EP | 0 996 212 A1 | 4/2000 |
| EP | 1 793 469 A1 | 6/2007 |

(Continued)

OTHER PUBLICATIONS

Patel Bhageerath Reddy, et al., "Conseptual Design of Sleeve Rotor Synchronous Reluctance Motor for Traction Applications", ET Electric Power Applications vol. 10, No. 5, pp. • Apr. 2016.

(Continued)

*Primary Examiner* — Emily P Pham
(74) *Attorney, Agent, or Firm* — Meagher Emanuel Laks Goldberg & Liao, LLP

(57) ABSTRACT

According to various embodiments, a synchronous reluctance machine is disclosed. The synchronous reluctance machine includes a stator, a synchronous reluctance rotor disposed within the stator and configured to rotate relative to the stator, and a non-magnetic sleeve disposed circumferentially around the rotor, where sleeve thickness is between about 1 mm and 2 mm and an air-gap radius is between about 80 mm and 100 mm.

20 Claims, 12 Drawing Sheets

(56) References Cited

U.S. PATENT DOCUMENTS

| | | | |
|---|---|---|---|
| 5,563,463 A | 10/1996 | Stark | |
| 7,439,702 B2* | 10/2008 | Smith | F25B 31/006 318/701 |
| 7,598,645 B2* | 10/2009 | Ley | H02K 1/2766 310/156.38 |
| 7,652,404 B2 | 1/2010 | El-Refaie et al. | |
| 2003/0178903 A1* | 9/2003 | Rapp | H02K 5/128 310/156.28 |
| 2003/0184185 A1 | 10/2003 | Yoshino et al. | |
| 2003/0193258 A1* | 10/2003 | Reiter, Jr. | H02K 1/02 310/216.004 |
| 2004/0021396 A1 | 2/2004 | Ehrhart et al. | |
| 2010/0084935 A1 | 4/2010 | Jadric et al. | |
| 2013/0057099 A1* | 3/2013 | Murray, III | H02K 16/00 310/114 |
| 2013/0057103 A1* | 3/2013 | Han | H02K 1/2773 310/156.12 |
| 2013/0221789 A1* | 8/2013 | Atkinson | H02K 1/276 310/156.67 |
| 2014/0231116 A1* | 8/2014 | Pollock | B25B 21/00 173/183 |
| 2017/0054337 A1* | 2/2017 | Arimatsu | H02K 1/30 |
| 2017/0093236 A1* | 3/2017 | Laldin | H02K 1/28 |

FOREIGN PATENT DOCUMENTS

| | | |
|---|---|---|
| EP | 2 442 432 A2 | 4/2012 |
| EP | 2 894 767 A2 | 7/2015 |

OTHER PUBLICATIONS

Extended European Search Report and Opinion issued in connection with corresponding EP Application No. 17167677.8 dated Aug. 30, 2017.

European Office Action issued in connections with corresponding EP Application No. 17167677, issued Mar. 19, 2019.

* cited by examiner

SLEEVE ROTOR SYNCHRONOUS RELUCTANCE ELECTRIC MACHINE

CROSS-REFERENCE TO RELATED APPLICATIONS

This application claims priority to provisional application 62/327,043, filed on Apr. 25, 2016, which is herein incorporated by reference in its entirety.

STATEMENT REGARDING FEDERALLY SPONSORED RESEARCH OR DEVELOPMENT

This invention was made with government support under Grant No. DE-EE0005573 awarded by the U.S. Department of Energy. The government has certain rights in the invention.

BACKGROUND OF THE INVENTION

The present invention relates generally to electrical machines and, more particularly, to a synchronous reluctance electrical machine topology that utilizes a rotor retained by a composite sleeve.

High speed, high power density electrical machines are essential to traction motor applications. To get the most power per unit volume, permanent magnet electrical machine are typically used for their many desirable attributes. While interior permanent magnet (IPM) machines have been the primary candidates for traction motors in light-duty hybrid/electric vehicles (HEV/EV), the price and availability of magnets have been a cause of concern. Typically these motors use Neodymium Iron Boron (NdFeB) permanent magnets, which contain both light rare earth materials as Neodymium (Nd) as well as heavy rare-earth materials as Dysprosium (Dy). One of the key risks in terms of using these rare-earth magnets is the significant fluctuation/increase in their prices over the past few years. Traction applications as well as wind generators that use large quantities of these magnets were the most affected by these fluctuations. There has been an ongoing global effort to try to reduce or eliminate the use of rare earth materials without sacrificing performance. As a part of elimination of rare-earth materials, conventional topologies such as induction, switched reluctance and synchronous reluctance are being considered as alternatives.

Synchronous reluctance machines are particularly appealing due to their smooth and simple passive rotor structure, i.e., the absence of magnetic flux exciting structures like magnets or coils), comparable power density to induction motors, low rotor losses, absence of magnets, and simple control. The absence of magnets in this configuration is attractive particularly because of the volatility of rare-earth material prices. Additionally, the risk of demagnetization or uncontrolled back-emf generation (the back-emf of the motor exceeds the DC link voltage) is eliminated. The key disadvantages of the synchronous reluctance machine are low power factor and typically limited constant power speed ratio (CPSR). This is mainly due to the presence of bridges and/or center-posts, especially in high-speed machines. FIG. 1 illustrates a conventional synchronous reluctance machine 10 with bridges 12 and center posts 14. The bridges 12 and center posts 14 provide a path for increasing the leakage flux in the synchronous reluctance machine 10. Since this leakage flux does not add to the electromagnetic torque provided, the loss of flux to leakage reduces the torque and hence the power factor of the machine 10. Additionally, the inductance from the leakage flux adds to the machine voltage limiting the voltage available for torque production. The limitation of the voltage is especially problematic at high speed operation, where the presence of the bridge 12 and center posts 14 reduces voltage available to torque production and leads to a precipitous drop in the output torque, i.e, a lower constant power to speed ratio (CPSR).

High speed synchronous reluctance machines with large rotor diameters require robust physical retention. A conventional synchronous reluctance machine 10 relies on flux paths through the rotor that must be retained by physical features to prevent them from deforming into the air-gap of the machine 10. These retention features are typically built into the configuration of the rotor laminations in the form of bridges 12 and center posts 14. The higher the speed and larger the rotor diameter gets, the thicker the bridges 12 and center posts 14 need to be. The thicker these features are, the lower the performance capability of the machine 10. The performance of the conventional synchronous reluctance machine 10 is typically not as good as permanent magnet versions, especially in high speed applications because of the mechanical limitations of the spinning rotor structure.

Thus, there is a need for a synchronous reluctance electrical machine that mitigates the need for center posts as well as being suitable for high-speed operation. Reducing the center posts would significantly ease the issue of leakage paths in the center posts as well as reduce torque ripple and rotor losses.

SUMMARY OF THE INVENTION

According to some embodiments, a synchronous reluctance machine is disclosed. The machine includes a stator; a rotor disposed within the stator and configured to rotate relative to the stator; and a sleeve disposed circumferentially around the rotor.

According to some embodiments, a traction motor is disclosed. The traction motor includes a stator; a synchronous reluctance rotor disposed within the stator and configured to rotate relative to the stator; and a sleeve retained circumferentially around the rotor.

Various other features and advantages will be made apparent from the following detailed description and the drawings.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only exemplary embodiments of the invention and are not, therefore, to be considered to be limiting its scope, the invention will be described and explained with additional specificity and detail through the use of the accompanying drawings, in which.

DETAILED DESCRIPTION OF THE INVENTION

According to various embodiments, disclosed herein is a synchronous reluctance electric machine topology that utilizes a rotor retained by a composite sleeve, which enables the removal of typical mechanical retention features that degrade machine performance. By mechanically retaining the rotor features using a circumferential composite sleeve, center posts are eliminated from the configuration and bridge size is minimized. When these features are reduced, the magnetic flux is conducted substantially only through the intended paths, and machine performance is increased. With this sleeved configuration, higher efficiency and torque production can be achieved.

Figure 1:
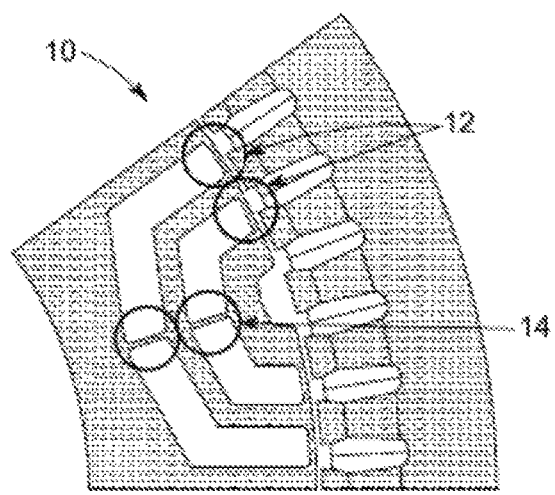
FIG. 1 is a conventional synchronous reluctance electric machine.
Figure 2:
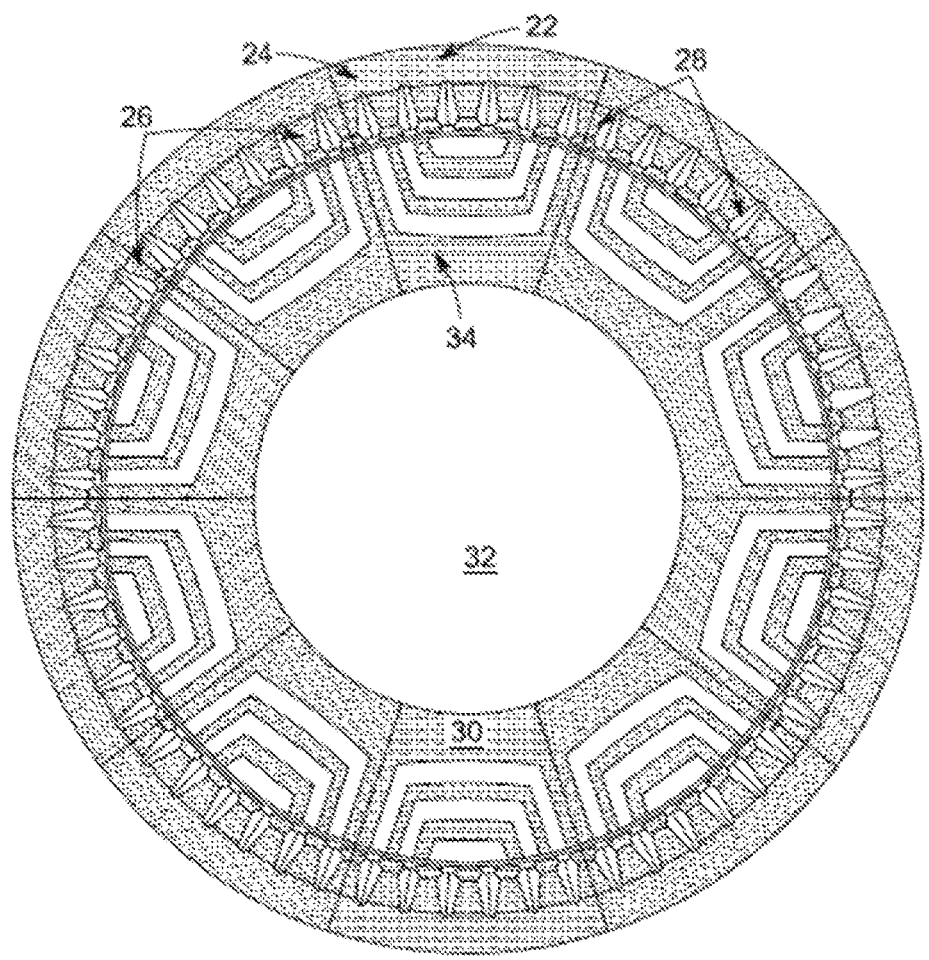
FIG. 2 is a cross-section of a synchronous reluctance electric machine according to an embodiment of the present invention.

FIG. 2 illustrates a cross-section of a synchronous reluctance electric machine 20 according to an embodiment of the present invention. The machine comprises a stator 22 including a stator yoke 24 and multiple stator teeth 26. Windings 28 are wrapped around the stator teeth 26. In one embodiment, the windings 28 are fractional slot concentrated windings. Each pair of diametrically opposite stator teeth 26 is connected is series or parallel to form an independent phase winding of the synchronous reluctance machine 20. In an exemplary embodiment, the synchronous reluctance machine 20 has a three phase winding.

The synchronous reluctance machine 20 also includes a rotor 30 having a rotor core 32 and concentric with the stator 22. The rotor core 32 may include multiple laminated sheets disposed on top of each other, or may be formed as a single piece. The rotor 30 also includes rotor poles 34 which comprise multiple ferromagnetic regions and non-ferromagnetic regions formed of a single material and are selectively formed so as to enhance a synchronous component reluctance torque and reduce a contribution of undesirable harmonic components of magnetic flux generated by the windings 28. The synchronous reluctance machine 20 distinguishes from a permanent magnet machine by not having windings on the rotor teeth and not having permanent magnets embedded in either the rotor or stator teeth.

Figure 3:
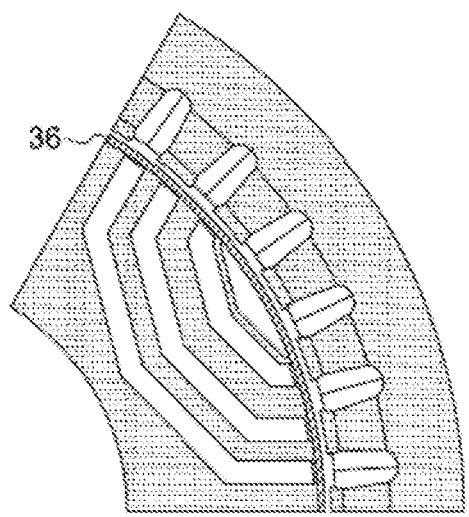
FIG. 3 is a cross-section of a synchronous rotor according to an embodiment of the present invention.

FIG. 3 illustrates the cross-section of a synchronous reluctance machine 20 according to an embodiment of the present invention. A sleeve 36 is wrapped around the outer periphery of the rotor 30 of the electrical machine 20. The sleeve 36 is lightweight, multiple times stronger than metallic materials, and non-magnetic, so as to not incur additional electromagnetic losses.

Placing a sleeve 36 around the rotor 30 of the machine 20 increases the electromagnetic air gap of the machine 20, which lowers electromagnetic torque performance. However, including the sleeve 36 enables the machine 20 to be configured with a larger diameter and spin at a higher speed, enabling good torque production and high power output. The gains in performance from the larger rotor 30 and higher rotational speed outweigh the torque performance degradation due to increasing the air gap. These attributes also allow the mass of the machine 20 to be small, an appropriate fit for traction applications. The performance of the machine 20 can be competitive with permanent magnet machines which use expensive materials.

The sleeve 36 can be made out of either carbon-fiber such as HexTow IM7 or high-strength conductive non-magnetic material such as Inconel. Use of carbon fiber is effective in reducing the rotor losses, but it has comparably lower thermal conductivity. On the other hand, conductive materials like Inconel can eliminate the thermal concern at the cost of higher sleeve losses. To add stability and stiffness to the rotor sleeve 36, an intermediate layer of fibers may be arranged in the axial direction for every nine layers arranged in the circumferential direction referred to as a 90/10 configuration.

For electromagnetic analysis, sleeve thickness itself may be a function of air-gap radius and rotor tip speed (tangential velocity at the outer radius). The effective air-gap thickness is equal to the sum of the sleeve thickness and the physical air-gap. At lower radii, the sleeve thickness may be smaller, which benefits the reluctance, while at higher radii the sleeve thickness has to be increased to compensate for higher centrifugal forces. This has a counter effect on the increased torque density at the higher radius. The thicker the sleeve 36, the larger the gap between the electromagnetic portions of the rotor 30 and stator 22, which increases reluctance of the magnetic circuit and reduces torque capability.

Therefore, an embodiment of the disclosed synchronous reluctance machine 20 may be optimized for torque density at peak power, as per the requirements in Table I shown below. At the same time, the machine 20 also needs to provide maximum power at the top speed of 14,000 rpm in order to meet the continuous power of 30 kW.

TABLE I

SUMMARY OPTIMAL ADVANCED TRACTION MOTOR REQUIREMENTS

| Parameter/Metric | Value |
| --- | --- |
| Peak Power @ 2800 r/min | 55 kW |
| Maximum Speed | 14000 r/min |
| Continuous Power | 30 kW |
| Mass Power Density for total machine | >1.6 kW/kg |
| Vol. Power Density for total machine | >5.67 kW/l |
| Constant Power Speed Ratio | 5:1 |
| Maximum Phase Current | 400 Arms |
| Peak Line-to-Line back-emf @ 2800 r/min | 600 V |
| Efficiency at 20% Rated Torque up to the max. speed | >95% |

At least two different air-gap thickness functions may be considered for the synchronous reluctance machine 20 to reflect two choices of sleeve material—(a) Carbon fiber (Air-gap function 1) and (b) Inconel (Air-gap function 2). From a mechanical perspective, the sleeve thickness can be different between the two materials due to the difference in tensile strengths. Each of these air-gap functions provide a relation between the effective air-gap in the machine 20 as a function of the rotor outer radius. An air-gap function is seen as an effective way of including first order mechanical effects into the electromagnetic performance. With an assumption that a sleeve 36 is not needed at lowest radius and the minimum air-gap thickness of 0.5 mm is needed, one of the air-gap thicknesses approaches to a value of 0.5 mm at lower radii, while the other function approaches to 0.75 mm. Additionally each of the air-gap functions has a quadratic relation with the air-gap thickness in accordance to the increase in the centrifugal force of the lamination. Two different sleeve materials, i.e. Inconel and Carbon fiber, correspond to the two air gap functions.

Figure 4:
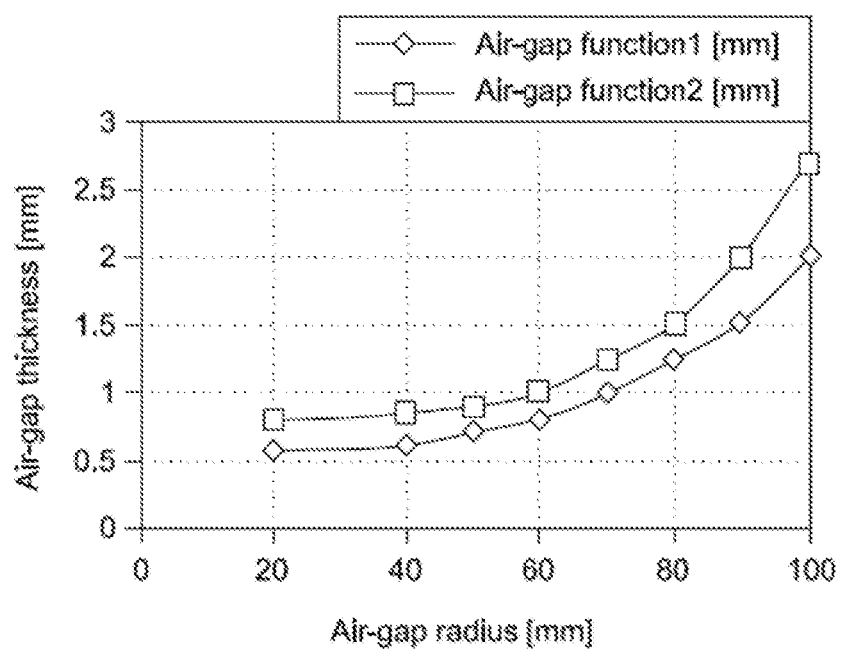
FIG. 4 is a graph of air-gap thickness functions versus air-gap radius according to an embodiment of the present invention.
Figure 5:
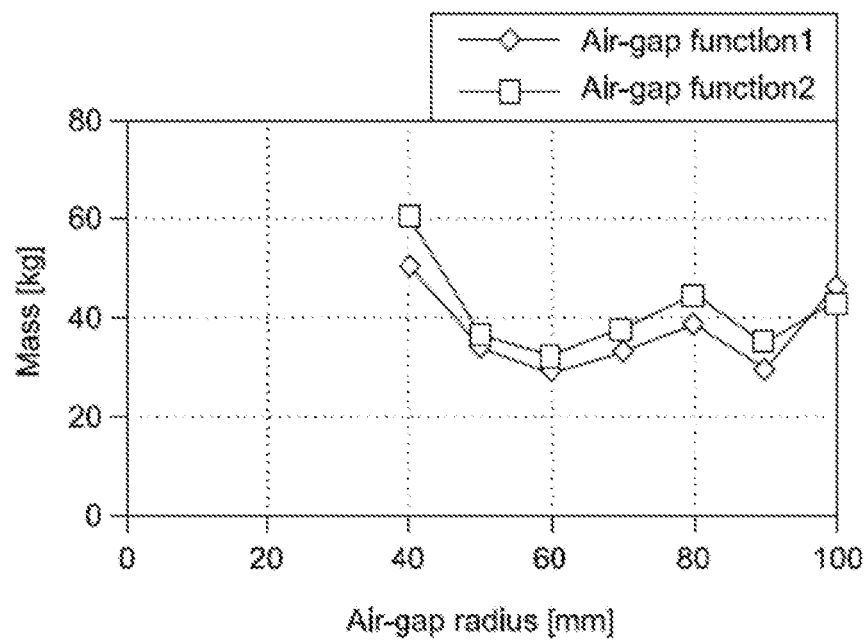
FIG. 5 is a graph of the mass of optimized configurations of two air-gap functions according to an embodiment of the present invention.
Figure 6:
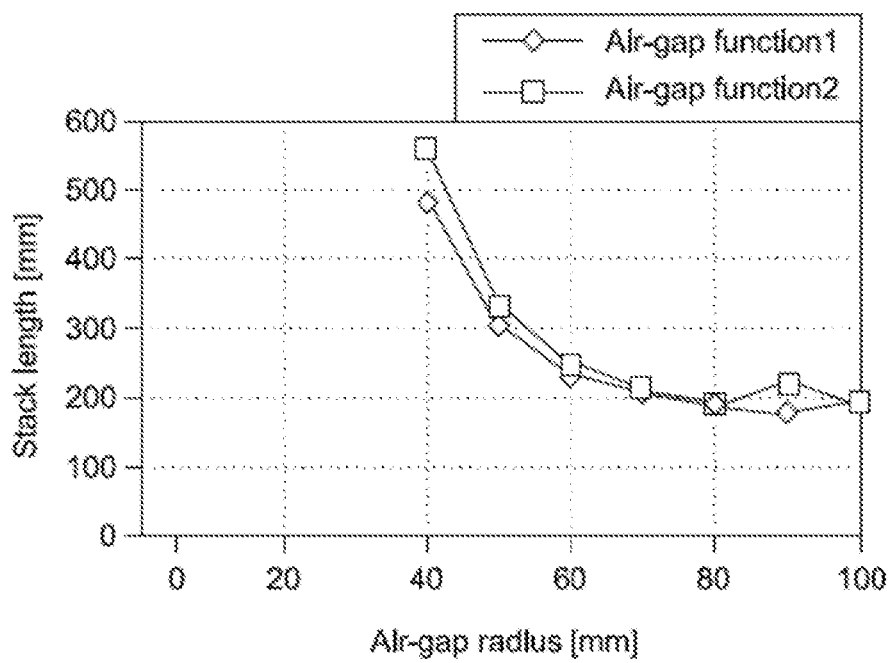
FIG. 6 is a graph of the stack length of optimized configurations of two air-gap functions according to an embodiment of the present invention.
Figure 7:
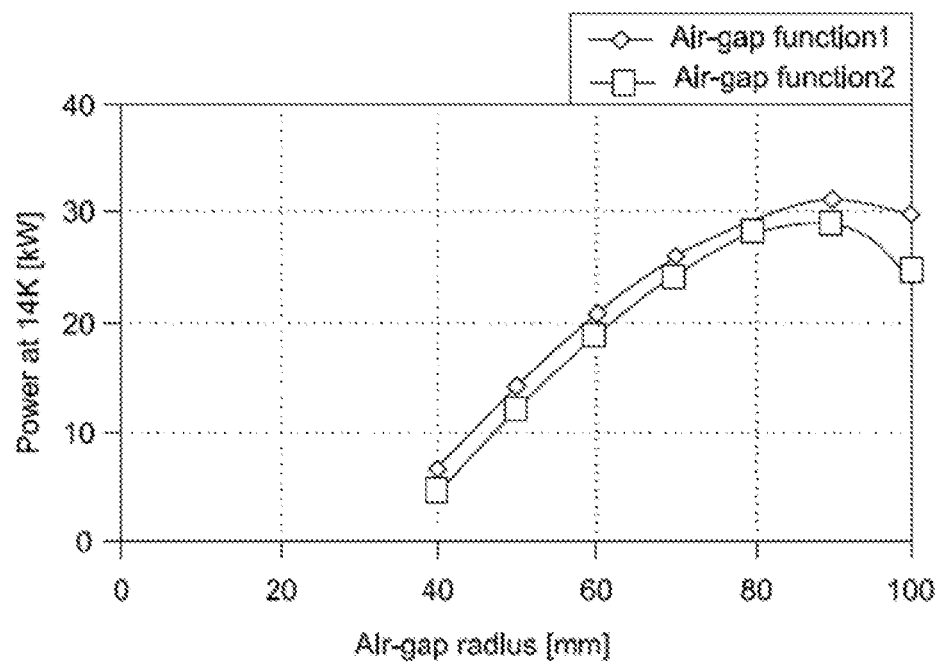
FIG. 7 is a graph of power achievable at top speed by optimized configuration of the two air-gap functions versus air-gap radius according to an embodiment of the present invention.

The chosen effective air-gap (sleeve+physical air-gap) functions are shown in FIG. 4. These air-gap thickness functions capture a first order effect of the centrifugal forces showing sleeve thickness squared vs. rotor radius. Since the problem of mechanical retention is a complex one, these thickness functions do not account for the exact rotor shape and only represent a function to be used for electromagnetic optimization. The machine 20 is optimized at each of the operating points for the torque density under the peak torque conditions. For the sake of simplification, the post and bridges are eliminated in the configurations. The stator 22 is a conventional 2-slot/pole/phase stator 22 comprising of 60 slots, while the rotor 30 has 10 poles 34. For the sake of comparison to a conventional synchronous reluctance rotor, the pole and slot numbers are fixed to 10 and 60, respectively. The masses and stack lengths of optimized configurations are shown in FIGS. 5 and 6, respectively. Interestingly, the optimum seems to occur at two points, i.e., 90 mm and 60 mm. However, the configurations at 80, 90 and 100 mm are able to produce power close to 30 kW at top speed, as shown in FIG. 7. Machines with lower air-gap radii become quite long axially and are at a disadvantage to with respect to producing the necessary power at the top speed.

Figure 8:
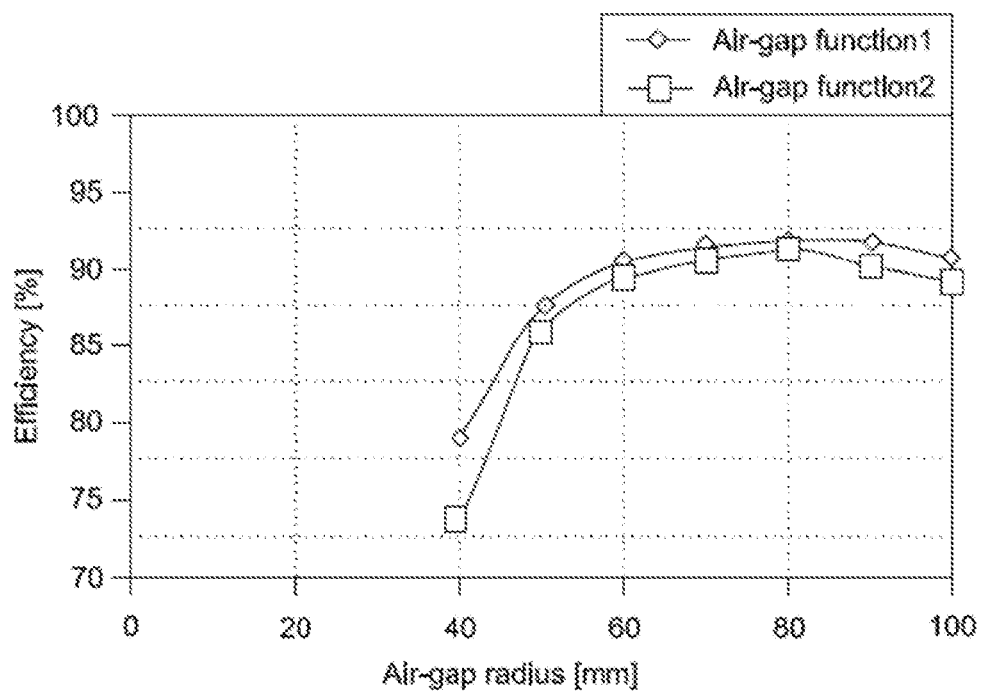
FIG. 8 is a graph of efficiency at the maximum power achievable at top speed by optimized configurations of the air-gap functions according to an embodiment of the present invention.

Total efficiency under the continuous power of 30 kW at top speed shown in FIG. 8 indicates that configurations above 80 mm up to 100 mm have the best performance. The lower radii configurations cannot produce the requisite 30 kW and hence the efficiency is better in configurations above 80 mm due to the higher achievable power. Based on the above analysis, an air-gap radius of 90 mm may be optimal for use with a sleeve 36. However, since this does not account for a complete mechanical analysis, the final optimization is done at two rotor radii of 90 and 100 mm.

The use of a continuous circumferential sleeve for mechanical retention of rotor components has been used in surface permanent magnet (PM) machines, such as U.S. Pat. No. 6,995,489, herein incorporated by reference in entirety. However, increasing the gap between the rotor 30 and stator 22 increases the reluctance of the magnetic circuit, which is counterintuitive for reluctance machines 20 that typically work to reduce the gap. Adding a sleeve 36 in reluctance machines 20 allows higher rotational speeds and larger diameter rotors 30 than conventional configurations. There is an inherent disadvantage of using a continuous sleeve 36 that comes from increasing the air gap of the machine 20. The physical air gap can typically remain the same, but the electro-magnetic gap must increase due to the thickness of the sleeve 36 on the rotor 30. The sleeve material is required to be of a non-magnetic material as to not interfere with the flux paths in the rotor 30. Additionally, a monolithic magnetic material in the air gap would be subject to large eddy current losses. Inconel material may be used for rotor sleeves 36 because it is non-magnetic and can be machined easily to a tight tolerance.

Another suitable material candidate is graphite fiber composite. It is non-magnetic and has a tensile strength many times that of steel or Inconel. To construct the composite sleeve 36, layers of graphite fibers are laid in the circumferential direction (hoop layers) with axial layers periodically in between to provide stiffness in the axial direction of the rotor. IM7 graphite fiber material with 90% hoop layers and 10% axial layers may be used in a preferred embodiment. The layers are covered with a resin to bond them together and cured.

An axisymmetric analysis of half of one rotor pole 34 was used to determine the required thickness of the sleeve 36 for each of the component configurations. The stress analysis assumes the rotor laminations are keyed on to the rotor 30 and torque transmission happens through a key. The rotor lamination for the 10-pole, 2-layer rotor configuration is allowed to have 0.5 mm thick bridges to preserve the integrity of the lamination and hence allow for easier manufacturability. Additionally, since the largest diameter rotor configuration is 200 mm, the sleeve thicknesses are varied from 0.5 to 2 mm, while the physical interference fit, the clearances between components under assembly process, between the sleeve 36 and rotor 30 is varied from 0 to 10 mil at the contact.

Similar analysis performed with a graphite fiber composite sleeve 36 has led to a sleeve thickness of 1 mm. At that thickness the sleeve 36 is stiff enough to retain the lamination deformation of the sleeve 36 into the air-gap without exceeding the allowable stress of the IM7 material. The maximum deformation of the sleeve 36 into the air-gap is limited to 12 mils, essentially 33% of the air-gap. The hoop stress within the carbon fiber sleeve 36 is limited to 200 ksi while the tensile strength of IM7 90/10 is about 8 times the max stress in the material. Additionally, the maximum deflection in the laminations is limited to 12 mils as well but occurring in the rotor lamination regions. However in addition to adhering to the stress limits of the graphite fiber, additional constraints were added in terms of the pressure limits at the interface between the rotor 30 and the sleeve 36. In other words, under rotation, one of the constraints was that the graphite fiber should not lose surface contact with the rotor lamination, as well as have a pressure point beyond the yield strength of the carbon fiber.

Based on the mechanical analysis described above, the final sleeve thickness may be 1.0 and 2.0 mm for the carbon fiber and Inconel materials, respectively. An optimization of the configuration is done around the respective sleeves with the primary objective of torque density. Since the previous optimization runs indicated that an optimal configuration exists at around a rotor radius of 90 mm, optimization is done at both 90 and 100 mm rotor radii. Both the configurations use a carbon fiber sleeve thickness of 1 mm, and with the air-gap being 0.7 mm, the total effective air-gap in either of the configurations is equal to 1.7 mm.

The performance of the final sleeve configurations is shown in Table II. Even though the configurations are different in terms of the air-gap radii and the stack length, the configurations are quite similar in terms of their final mass values as well as performances in terms of power density, high speed power and efficiencies. The overall active mass of the configurations are 35.8 kg and 35.4 kg for the 90 mm and the 100 mm configurations respectively, and both of the configurations are quite similar in terms of the power density, reaching values of 1.69 and 1.71 kW/kg respectively. Both of the configurations end up having similar copper mass in the end regions, while the difference in the copper mass comes in due to the difference in lengths. This leads to the 100 mm configuration having a significantly lower copper mass of 3.8 kg, compared to the 5.4 kg of the 90 mm configuration. Both configurations do not contain magnets and the active material cost is lower than that of a permanent magnet motor.

TABLE II

Performance of Sleeve Configurations

| Item | 90 mm | 100 mm |
| --- | --- | --- |
| Stack Length [mm] | 247.5 | 165.75 |
| Mass w/o shaft [kg] | 35.8 kg | 35.4 kg |
| Total Copper Mass [kg] | 5.45 kg | 3.83 kg |
| End Turn Copper Mass [kg] | 1.78 kg | 1.61 kg |
| Stator OD [mm] | 222.7 mm | 249.1 mm |
| Air-gap Diameter [mm] | 180 mm | 200 mm |
| Rotor ID [mm] | 120.5 mm | 117.9 mm |
| Physical Air-gap [mm] | 1.7 mm | 1.7 mm |
| Power Density [kW/kg] | 1.69 | 1.71 |
| Peak Power at TCP [kW] | 60.5 | 60.4 |
| Saliency at Peak Power | 3.11 | 3.29 |
| Power at 14k [kW] | 29.4 kW | 28.2 kW |
| Efficiency at TCP [%] | 85.4 | 85.5 |
| Efficiency at 14k [%] | 90.2 | 91.4 |

Since the configuration topologies are similar and the 100 mm configuration has a slight advantage in terms of mass, saliency and efficiency, the results from the 100 mm configuration were investigated and were used for the final comparison to the conventional electrical machines described further detail below.

Figure 9:
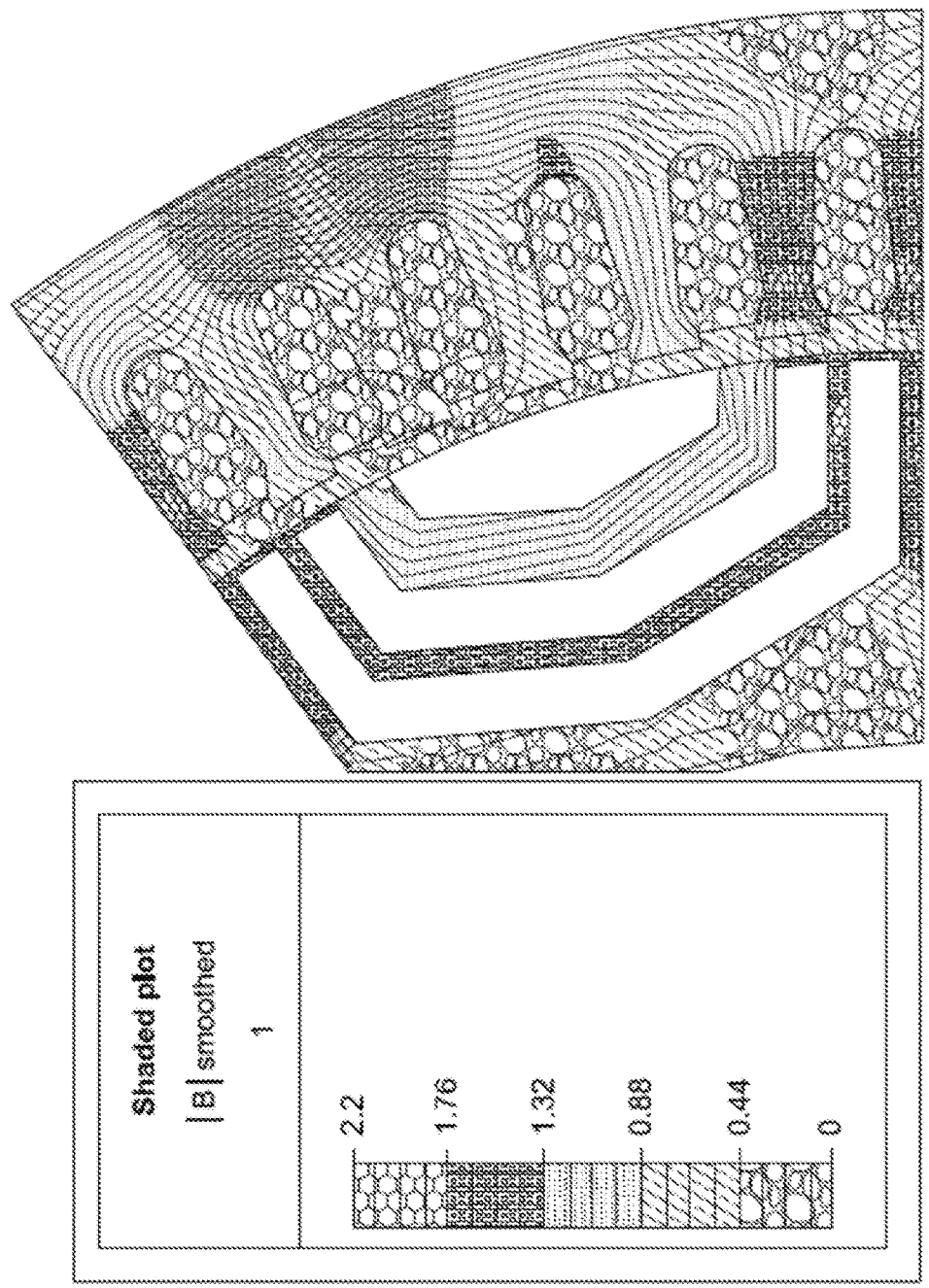
FIG. 9 is a diagram of peak torque excitation according to an embodiment of the present invention.

The 100 mm fares only slightly better in terms of the saliency, i.e., the ratio of the maximum and minimum inductances of the rotor under rotation) at peak power as well as the top speed conditions. Under the peak power conditions, the electric machine 20 is under magnetic saturation. The flux density variation with the electrical angle as well as the harmonics under the peak torque conditions are illustrated in FIG. 9. Clearly, except at the regions of the bridges and stator tooth base, most of the machine 20 is quite unsaturated, especially the rotor q-axis path and along the stator yoke 24. Either of these sections sees a flux density of 1.5 T, while the tooth and bridge regions reach the saturation flux density of 2.1 T.

Figure 10:
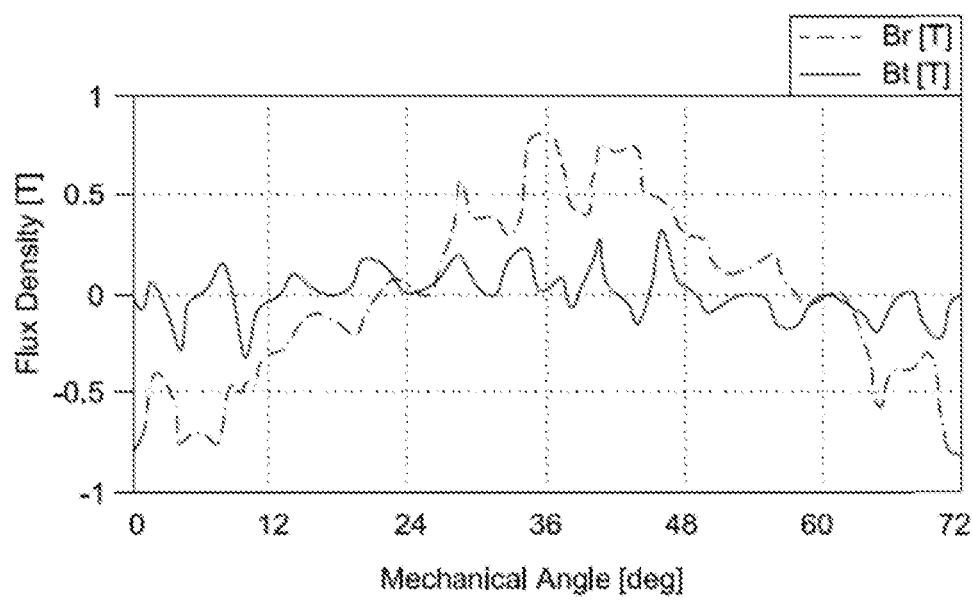
FIG. 10 is a graph of air-gap flux density under peak toque excitation according to an embodiment of the present invention.
Figure 11:
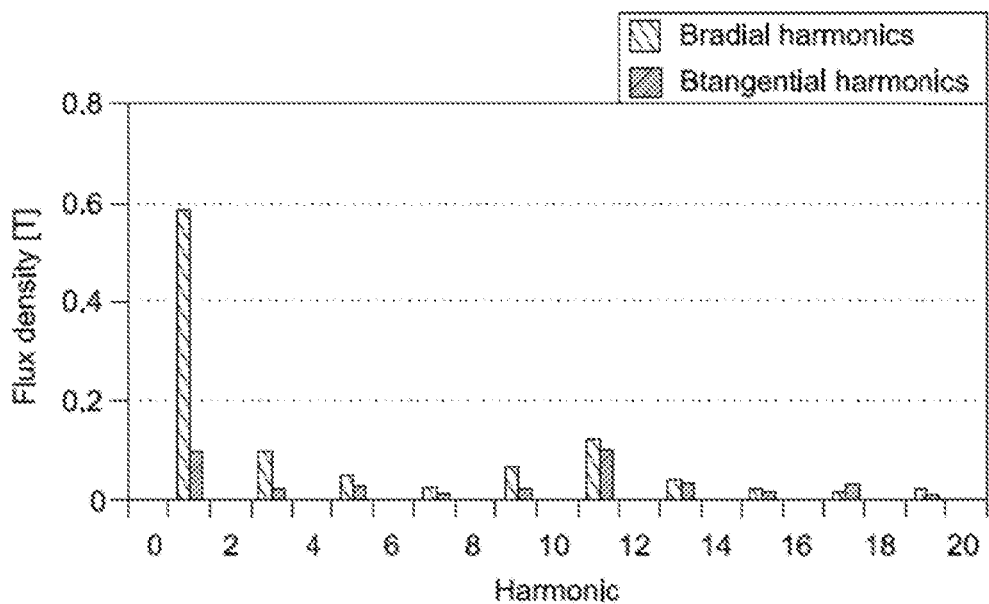
FIG. 11 is a graph of radial and tangential air-gap flux density harmonics under peak torque excitation according to an embodiment of the present invention.
Figure 12:
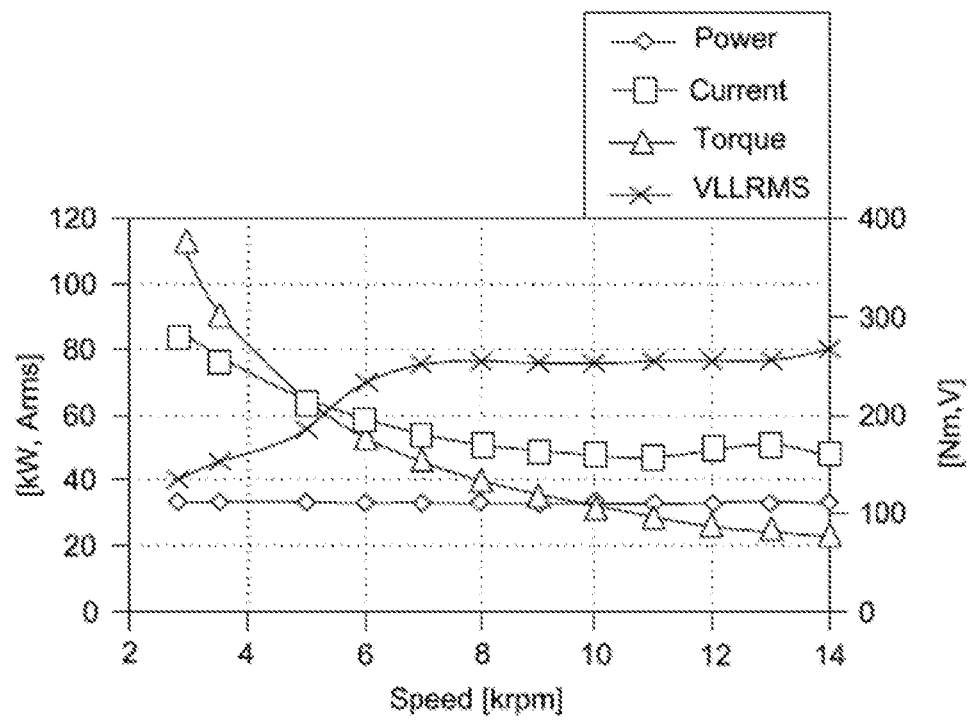
FIG. 12 is a graph of power, current, torque, and voltage under rated conditions according to an embodiment of the present invention.

The air-gap flux density contours with the 100 mm configuration under the peak torque conditions (i.e. an excitation current of 400 Arms and 50° gamma angle for electrical input to the machine) are shown in FIG. 10. The graph shows that both the radial and tangential flux densities contain significant harmonics, while the radial flux density almost resembles a saw-tooth waveform. Peak values of the Fourier harmonic components of the radial and tangential flux densities under the peak torque condition are shown in FIG. 11. Clearly the peak radial flux density does not exceed 0.6 T, which can be considered to be fairly low when compared to permanent magnet machines. The lower magnetic loading can have a direct impact on the size of the machine 20. Additionally, the air-gap field is rich in harmonics, especially around the $11^{th}$ harmonic, arising from the combination of the stator tooth and rotor tooth modulation. In other words, the stator excitation arising from six teeth is modulated by the five tooth stepped rotor magnetic permeance. The $11^{th}$ harmonic is capable of causing rotor losses but not sleeve losses due to the non-conducting nature of the sleeve 36. The rated performance with regards to the power, torque, current and line voltage of the 100 mm configuration is shown in FIG. 12. It can be seen that the continuous current is quite high under the lower speed conditions, and quickly falls within the 200 Arms limit. On the other hand, the voltage across the machine terminals reaches the limit of the six-step voltage available from the motor drive at around a speed of 7000 rpm, indicating the machine voltage corner point.

For the sake of comparison, a conventional electrical machine 10 (with magnetic bridges and posts) is configured with 10 poles and 2 layers. The sizing of the bridges 12 and center posts 14 is based on mechanical analysis at 14,000 rpm. In order to simplify the optimization of the conventional electrical machine 10, the bridges and posts thicknesses were fixed at 0.63 mm. The EM optimization revealed that if a conventional electrical machine 10 is configured for peak power, it is unable to maintain the constant power to speed range (CPSR) up to the top speed but only up to a speed of 10,000 rpm. Above speeds of 12,000 rpm, the configuration begins losing power and drops to 29 kW at the top speed. As discussed above, this is mainly due to the high leakage of the magnetic bridges 12 and posts 14.

The comparison of the sleeve vs. conventional configuration is summarized in Table III. As mentioned above, all of the machines are configured for similar peak output power at the corner point of 2800 rpm. However, since the sleeve configurations 20 are capable of the peak power of 60 kW, they are configured for a 10% higher peak power, so as to make them conducive for future improvements. On the other hand, the conventional electrical machine configuration 10 is only able to achieve a peak power of 56 kW, while maintaining the continuous power up to 12,000 rpm. In spite of the higher peak power output, the sleeve configuration 20 comes out 29% better in terms of power density than the conventional electrical machine 10. One of the main reasons for better power density is that the sleeve 36 allows an increase in air-gap radius.

TABLE III

Performance of Final Configurations

|  | Sleeve Embodiment | Conventional Machine |
|---|---|---|
| Poles | 10 | 10 |
| Layers | 2 | 2 |
| Sleeve Thickness [mm] | 1.0 | 0 |
| EM Air-gap [mm] | 1.7 | 0.7 |
| Stack Length [mm] | 165.75 | 315 |
| Active Mass [kg] | 35.4 kg | 42.7 kg |
| Stator OD [mm] | 249.1 mm | 201 mm |
| Air-gap Diameter [mm] | 200 mm | 155 mm |
| Rotor ID [mm] | 117.9 mm | 99 mm |
| Physical Air-gap [mm] | 1.7 mm | 0.7 mm |
| Power Density [kW/kg] | 1.71 | 1.32 |
| Peak Power at TCP [kW] | 60.4 | 56.3 |
| Saliency at Peak Power | 3.29 | 2.89 |
| Power at 14k [kW] | 28.2 kW | 18.2 kW |
| Saliency at 14k | 3.03 | 2.034 |
| Efficiency at TCP [%] | 85.5 | 85.1 |
| Efficiency at 14k [%] | 91.4 | 87.9 |
| Torque Ripple at Peak Power [%] | 9.5 | 72.8 |

Figure 13:
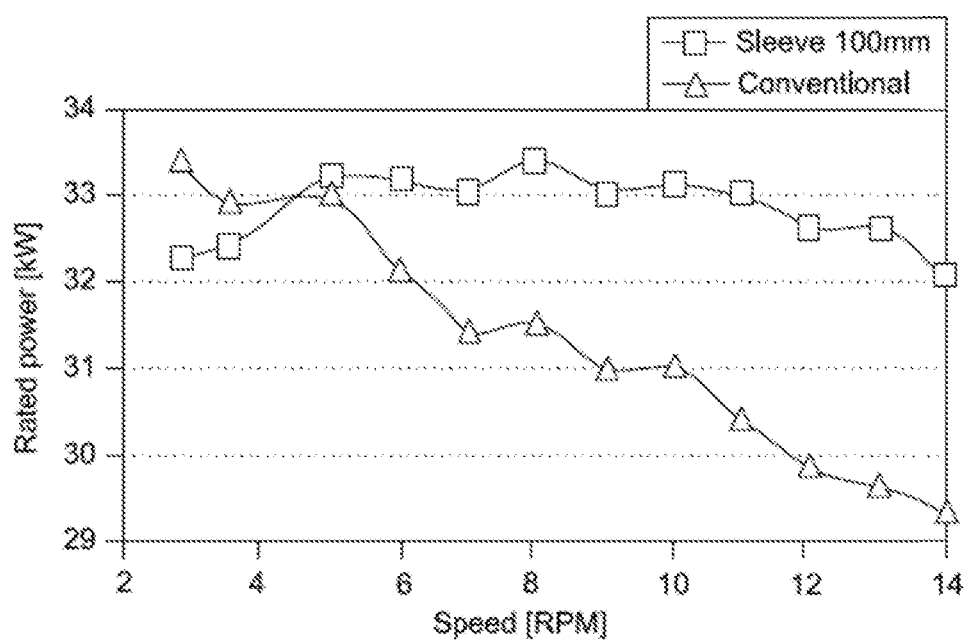
FIG. 13 is a graph comparing rated power versus speed according to an embodiment of the present invention.
Figure 14:
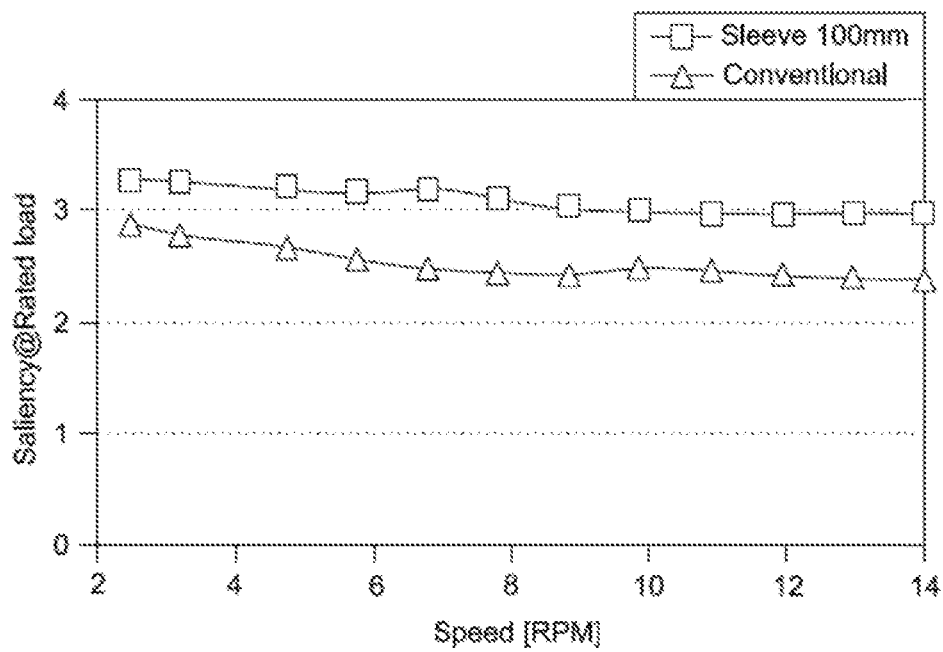
FIG. 14 is a graph comparing saliency at rated power versus speed according to an embodiment of the present invention.
Figure 15:
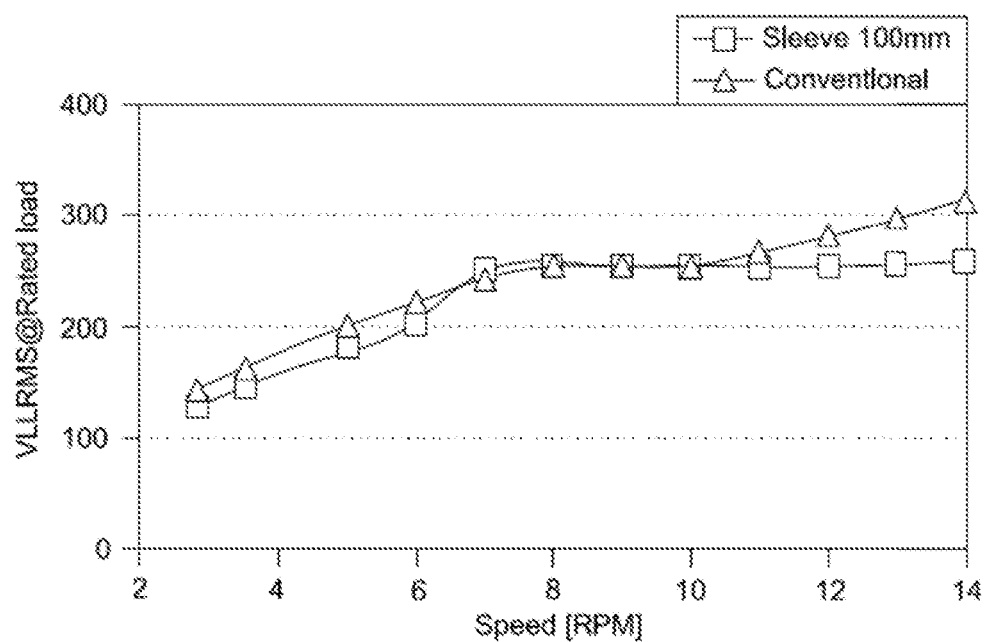
FIG. 15 is a graph comparing VLLRMS at rated power versus speed according to an embodiment of the present invention.

The rated output shaft power vs. speed for both motors is shown in FIG. 13. The sleeve configuration 20 is able to maintain a power above 30 kW over the entire speed range (i.e. from 2800 to 14,000 rpm), while the conventional electrical machine configuration 10 has a more rapid reduction in the available rated power, especially beyond the speed of 10 k rpm. The reason for the gradual reduction in the rated power vs. speed in the motors is understood by observing the saliency shown in FIG. 14. The saliency of the conventional electrical machine configuration 10 is well below 3, while the saliency in the sleeve configuration 20 under the rated power conditions is close to 3. Higher saliency in the electrical machine is beneficial because torque production arises solely from the reluctance torque. The bridges 12 and the posts 14 in the conventional electrical machine 10 are the primary paths of the leakage flux, which leads to the reduction in the saliency in this configuration. The sleeve configuration 20 has bridges of lower thickness, which limits the limits the leakage flux and improves the saliency. Better saliency has an effect on the power at the lower speed as well as the torque corner point. The comparison of the voltage under rated conditions shown in FIG. 15 indicates that the conventional rotor is not capable of staying within the voltage limit beyond a speed of 10,000 rpm. Extensive geometrical parameter variation in terms of the turns/phase as well as geometry variation failed to yield a configuration which is capable of producing the required 30 kW power up to the top speed of 14,000 rpm.

Figure 16:
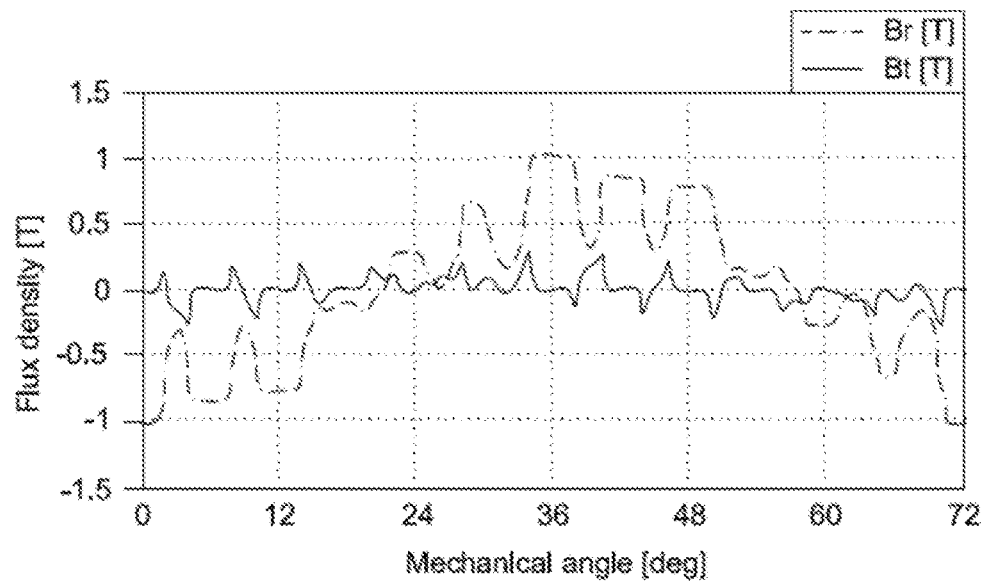
FIG. 16 is a graph comparing radial and tangential air-gap flux density harmonics at peak torque excitation according to an embodiment of the present invention.
Figure 17:
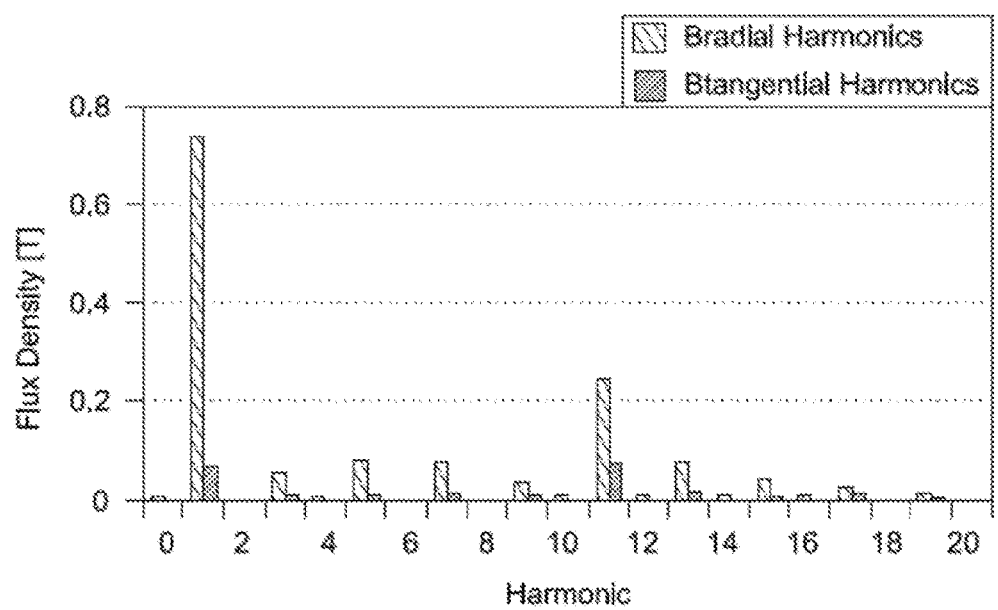
FIG. 17 is a graph comparing radial and tangential air-gap flux density harmonics under peak torque excitation according to an embodiment of the present invention.

The air-gap flux density in the conventional synchronous reluctance configuration under the peak torque conditions (i.e. an excitation of 400 Arms, 50° gamma) is shown in FIG. 16. Peak values of the Fourier harmonic components of the radial and tangential flux densities under the peak torque condition are shown in FIG. 17. The 11$^{th}$ harmonic in this configuration exceeds a flux density of 0.2 T, and will have a significant impact on the rotor losses, and torque ripple of the machine. Various losses in the machine are estimated with the help of electromagnetic analytical software as well as finite element software. Efficiency in both configurations is seen to be low around 85% in the lower speed regions. This is due to the copper losses being quite significant at the lower speeds, which reduces the efficiency. At higher speeds, due to the reduction of torque requirement, the current is reduced and the efficiency improves.

Figure 18:
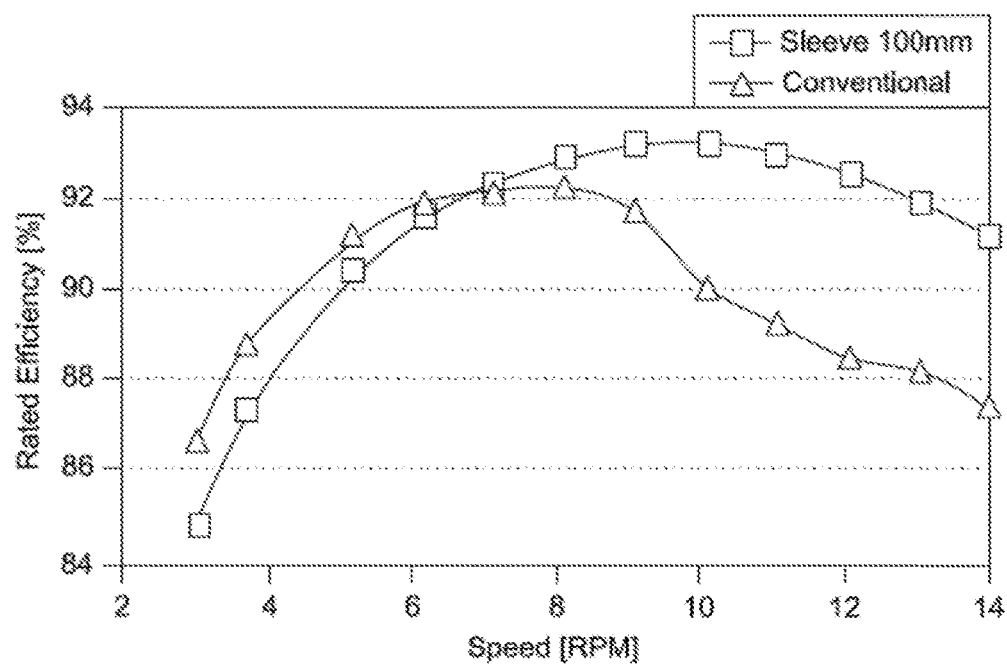
FIG. 18 is a graph comparing efficiency at rate power versus speed according to an embodiment of the present invention.

The variation of efficiency under rated load conditions of the configurations is shown in FIG. 18. Both configurations are quite similar in terms of efficiency up to the speed of 7000 rpm. At higher speeds, the current requirement of the conventional electrical machine configuration 10 increases to the point where the configuration can no longer meet the power requirements within the voltage constraint. This leads to the sleeve electrical machine configuration 20 having a better efficiency than the conventional electrical machine above 7000 rpm.

Figure 19:
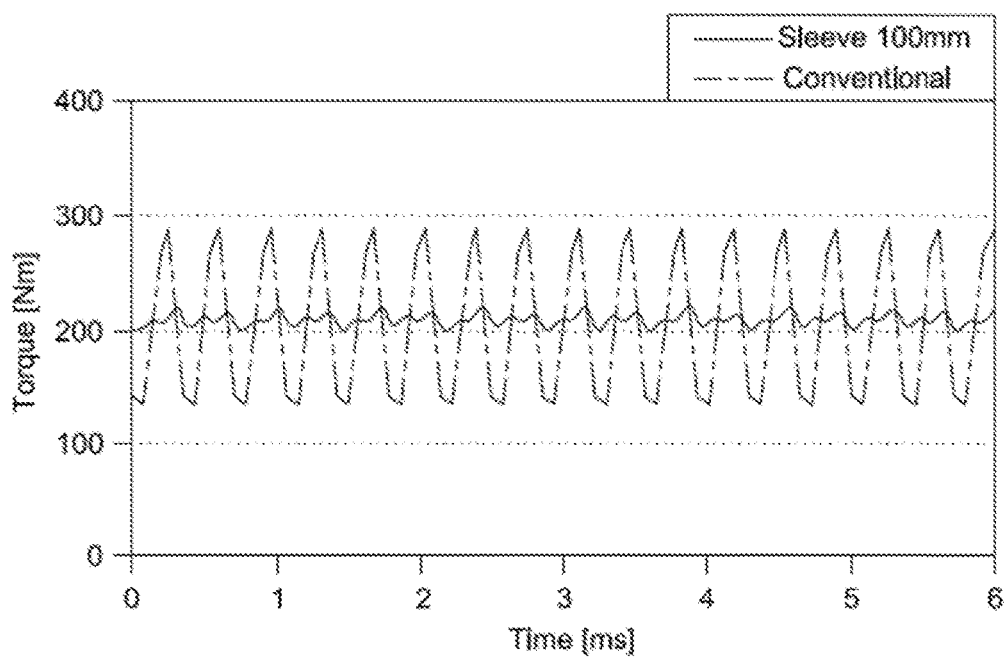
FIG. 19 is a graph comparing peak torque versus time showing torque ripple according to an embodiment of the present invention.

The comparison of the rotor losses is important from the perspective of cooling. Even though the rotor 30 does not contain any material susceptible to low temperature limits, the losses are important from the perspective of heat flow to the shaft and the bearings as well as thermal expansion of the rotor into the air-gap. In the conventional rotor configuration 10, rotor losses are within 400 W for the entire speed regime. The sleeve rotor configurations 20 are able to cut down these losses by nearly a factor of three. This is due to larger electromagnetic air-gap, where the air-gap harmonics are lower and is highly effective in limiting temperature increase as well as lowering rotor temperatures. The comparison of torque ripple at peak power FIG. 19 shows that the torque ripple is significantly reduced in the sleeve configurations 20. The sleeve configuration 20 at 100 mm has a torque ripple of just 9.5%. This is a significant reduction as compared to the conventional configuration 10 having a torque ripple of 72.8% at the peak power operating condition. The reduction of torque ripple in the sleeve configurations 20 attributes to the reduced harmonic content in the sleeve rotor 30 as compared to the conventional configurations 10, mainly due to the larger effective air gap.

Figure 20:
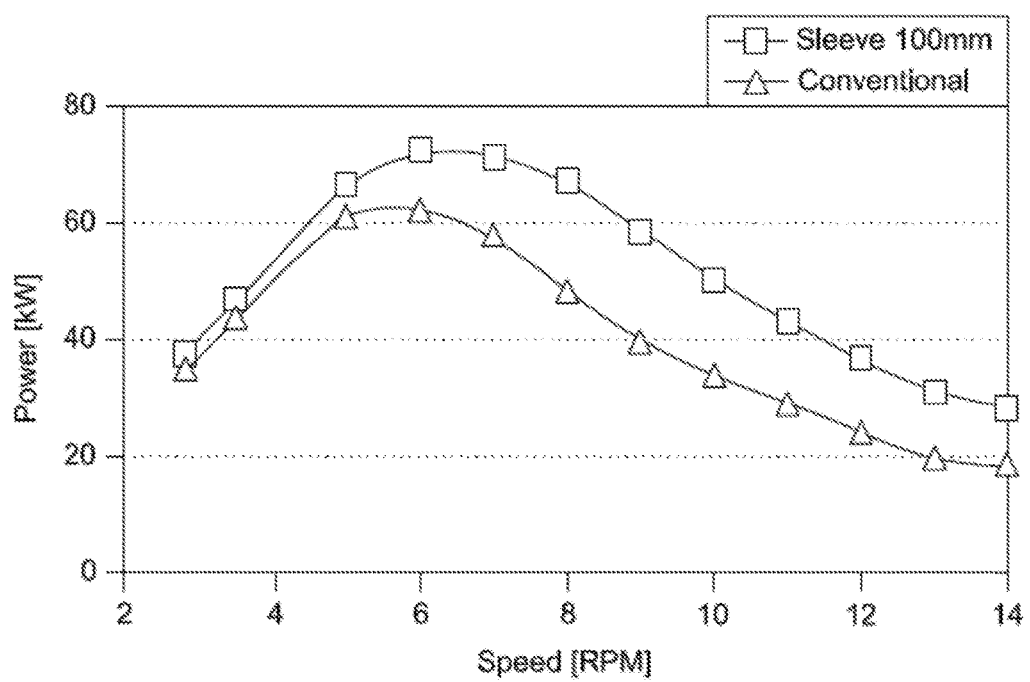
FIG. 20 is a graph comparing power capability versus speed according to an embodiment of the present invention.

The comparison of the motor power capabilities with a current of 300 Arms and 325 VDC is shown in FIG. 20. All the sleeve configurations perform in a similar manner in terms of the power capability at the low speeds up to 3000 rpm. At speeds above 3000 rpm, the sleeve electrical machine configuration 20 gains advantage over the conventional electrical machine configuration 10 and is 16% better in terms of the maximum power capability. At a speed of 6000 rpm and within the voltage limits of 325 VDC, the sleeve configuration 20 with 100 mm air-gap radius is able to produce an output power of 72.8 kW. Additionally, it can be seen that the sleeve electrical machine configuration 20 is able to provide the specified power up to the speed of 14,000 rpm, while the conventional electrical machine configuration 10 is unable to meet the power beyond a speed of 10,000 rpm.

Figure 21:
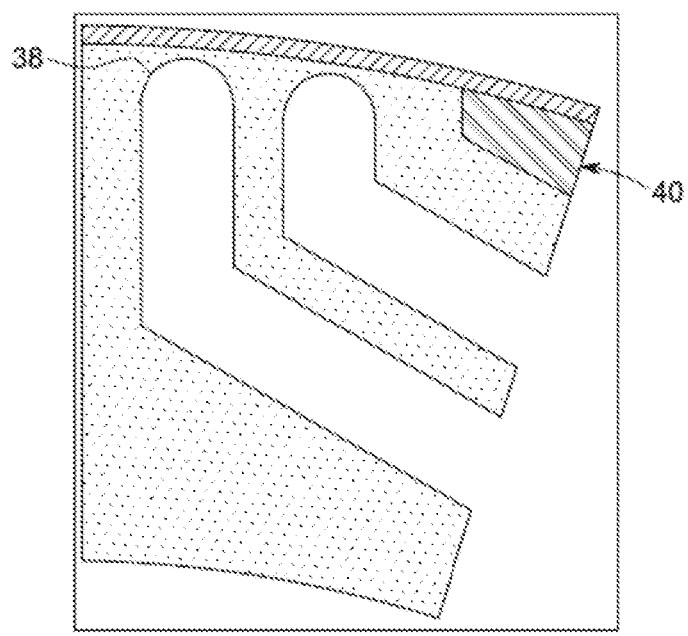
FIG. 21 is a cross-section of a synchronous rotor according to an embodiment of the present invention.

When subjected to a rotational velocity of 14,000 RPM about the z-axis (axial direction) at room temperature with no other external loads applied, a high amount of bending is observed at the areas where the flux paths contact the sleeve, causing non-uniform loading. The "arm" of the lamination between the poles shows very low deformation because of the continuous radial support, but the flux paths are only supported by the very thin bridges and the sleeve 36. This will cause high inter-laminar shear forces between the fiber layers. The sleeve 36 is not nearly as strong under this type of loading as it would be in the 0° direction of the fibers, i.e., direction parallel to fibers. To combat these large deflections, multiple steps may be taken, illustrated in FIG. 21.

First, large rounds 38, i.e., rounded edges, are placed in the bridges forming an arch structure to help stiffen them.

This will have a negative impact on the path reluctance of the bridge. However, the path length is slightly shorter than the previous bridge configuration and the minimum cross sectional area is the same, forming a "choke point" at the center of the bridge where the thickness is still 0.5 mm, meaning that saturation occurs at a similar level of flux linkage. Therefore, performance is not significantly affected. One additional benefit of this change is that the smooth transition created by the rounds 38 helps to lower torque ripple, which is a common problem for reluctance machines. Second, a low density, non-conductive wedge 40 is added to the outer center section of the pole to provide a continuous surface to contact the sleeve 36 around the entire circumference of the rotor 30, which should minimize the bending in the sleeve 36 and improve load distribution.

An investigation of the results in this alternative embodiment reveals some important information. First, the contact between the sleeve 36 and the rotor/wedge 30/40 is acceptable when observing the amount of gap at the sleeve interface. The largest relative radial displacement between the lamination and the sleeve 36 from stress analysis is only 0.0006 inches. The total radial deformation is reduced by just over 10% and bending is reduced significantly, as evidenced by the reduction in shear stress of 37%. In the circumferential direction, where the composite is the strongest, the maximum hoop stress is only 18% of the allowable 395 ksi for the material. The majority of the sleeve 36 experiences hoop stress between 50-60 ksi. The maximum stress can be seen to occur in areas where the sleeve interface is experiencing bending from the non-uniform deflection of the rotor lamination features.

Therefore, a 1 mm composite sleeve 36 is capable of retaining the alternative embodiment electrical machine without being stressed near its material limits. However, the steel laminations in the rotor 30 have a much lower tensile strength. Without the aid of the posts at the center of each rotor pole 34, the rotor 30 experiences high radial deflection and high stresses in the steel laminations. The bridges in particular experience significant bending and the maximum stress is 3.5 times the yield strength of the HF-10 material. To reduce the stress in the lamination, a non-conductive potting material such as Henckel Stycast is used to fill the air flux barriers in the rotor 30. The modulus of the potting material is low compared with the other materials, but helps to bond the rotor parts together as a singular unit. The potting compound is modeled with bonded contact to the lamination.

Adding the potting compound has a significant impact on reducing the maximum stress in the lamination. Bonding the flux paths together greatly reduces the deflection at the rotor OD. Further inspection of the results shows that the highest stress occurs closer to the inner diameter in the circumferential direction. To reduce this stress below the yield strength of the material, the inner diameter of the lamination is decreased. This inner surface will interface with the shaft of the machine. Reducing the diameter will not have a negative effect on electromagnetic performance since the flux paths are not affected. This has the effect of increasing the cross-sectional area of the inner "hoop" of the rotor 30, making it stronger in the circumferential direction and reducing this stress to an acceptable level. Along with reduced stresses, potting the flux barriers in the rotor 30 will also reduce the amount of radial deflection.

Further reducing the inner diameter of the rotor 30 can help to reduce this maximum stress even further. The lower configuration constraint for the rotor inner diameter is 50 mm compared to the current 110 mm. The results also suggest that due to the very high sleeve hoop stress safety factor and the good radial stress safety factor, it may be possible to extend the rotor outer diameter further or decrease the sleeve thickness to increase electromagnetic performance.

Sleeved rotors come with a host of challenges from a manufacturability aspect. The interference fit of the sleeve on the rotor is of particular concern. For many sleeved rotors, the rotor and sleeve are manufactured as separate, high precision parts. For metal parts, a sleeve installation with an interference fit would be performed by heating the sleeve to a temperature sufficient to provide clearance over the rotor and positioned where it would cool to produce the required interference. However, the coefficient of thermal expansion (CTE) of IM7 is almost 20 times lower than steel. Because the CTE of IM7 is so low, it will not expand enough to make this a feasible process. Composite sleeves of larger thickness are typically built with a taper along the axial length and a heavy interference fit. They are installed on the rotor (that has a matching taper angle) using high axial pressure. The thin 1 mm sleeve thickness proposed would not be able to withstand this sort of pressure without buckling.

Figure 22:
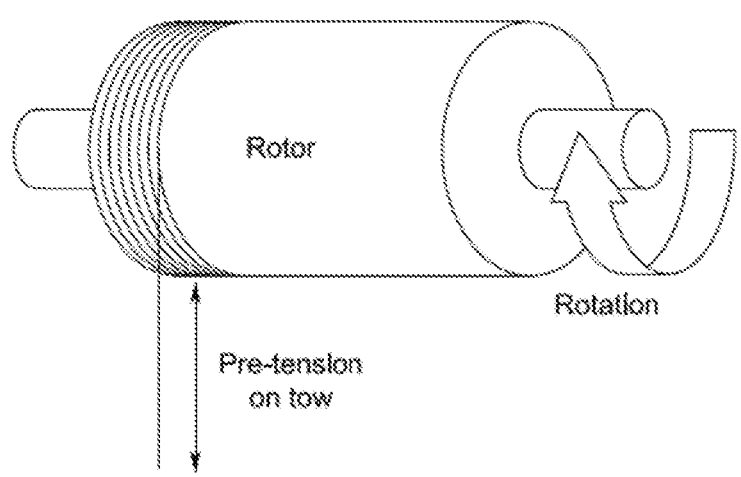
FIG. 22 is a diagram illustrating sleeve winding installation according to an embodiment of the present invention.

The proposed installation method for this application is to wind it on to the rotor 30 using a rotating lathe and feed system that can provide some tension during installation to get an equivalent "interference" or pre-tension on the sleeve 36. This disclosed installation method is illustrated in FIG. 22. As previously mentioned, the interference fit of 0.002" radial interference is quite light, making it an excellent candidate for winding installation. The winding technique uses fiber bundles that are impregnated with the bonding resin (called tow) and is cured in place once it is wound on the surface.

There are some important benefits to being able to use the winding technique for the sleeve. Primarily, the elimination of the taper has multiple benefits of its own. In applications with tapered rotors, because the stator is not tapered, the air gap is no longer uniform over the axial length. This is not ideal for machine performance, especially in the case of the reluctance machine. Also, the installation by compression of the sleeve 36 on the rotor 30 requires the outer rotor surface to be very tightly constrained for uniformity (to provide even contact) and surface roughness (not to abrade the inner surface of the sleeve). The very precise tolerance requirements create a machining challenge, especially when dealing with parts as large in diameter as the proposed electrical machine configuration.

The axially laminated structure of the rotor 30 is an important consideration for manufacturing. The rotor is made of numerous stacked laminations, all with their own slightly different outer profile. When stacked together, this creates a non-uniform "stagger" on the outer surface of the rotor in the axial direction. If the surface should preferably be to be machined to create a highly uniform mating surface, the thin laminates can become "smeared" from cutting or grinding. This creates electrical shorts between the laminates along the rotor surface which provides a path for large eddy currents to flow, which increase rotor losses and heating. This problem is abated when winding the sleeve in the circumferential direction, as no machining of the surface is necessary. The fibers will conform to the surface of the rotor and will be relatively unaffected by lamination stagger (misalignment) or surface roughness.

Therefore, a novel method of configuring an electrical machine with a rotor sleeve is disclosed. The introduction of the rotor sleeve is seen to allow the electrical machine configuration to operate at a higher rotor radius/tip speed. The higher air-gap radius allows for better saliency compared to a conventional electrical machine configuration with bridges, helping the configuration to achieve a wider constant power to speed ratio, besides also reducing the rotor losses and torque ripple. The mechanical analysis behind the sleeve stresses shows that the sleeve configuration is feasible up to the top speed of 14,000 rpm. The final sleeve electrical machine is seen to be superior to the conventional electrical machine in terms of power density, efficiency, flux-weakening, power capability, torque ripple and rotor losses.

It is understood that the above-described embodiments are only illustrative of the application of the principles of the present invention. The present invention may be embodied in other specific forms without departing from its spirit or essential characteristics. All changes that come within the meaning and range of equivalency of the claims are to be embraced within their scope. Thus, while the present invention has been fully described above with particularity and detail in connection with what is presently deemed to be the most practical and preferred embodiment of the invention, it will be apparent to those of ordinary skill in the art that numerous modifications may be made without departing from the principles and concepts of the invention as set forth in the claims.

What is claimed is:

1. A synchronous reluctance machine, comprising:
a stator;
a synchronous reluctance rotor disposed within the stator and configured to rotate relative to the stator; and
a non-magnetic sleeve disposed circumferentially around the rotor, wherein sleeve thickness is between about 1 mm and 2 mm and an air-gap radius is between about 80 mm and 100 mm.

2. The synchronous reluctance machine of claim 1, wherein the sleeve comprises carbon fiber or Inconel.

3. The synchronous reluctance machine of claim 1, wherein an intermediate layer of fibers of the sleeve is arranged in an axial direction for every nine layers arranged in a circumferential direction.

4. The synchronous reluctance machine of claim 1, wherein the machine is configured to provide maximum power at a top speed of about 14,000 rpm.

5. The synchronous reluctance machine of claim 1, wherein the rotor further comprises rounded corners for each bridge.

6. The synchronous reluctance machine of claim 1, wherein the rotor further comprises a plurality of non-conductive wedges disposed in an outer center section of each rotor pole.

7. A traction motor comprising:
a stator;
a synchronous reluctance rotor disposed within the stator and configured to rotate relative to the stator; and
a non-magnetic sleeve retained circumferentially around the rotor, wherein sleeve thickness is between about 1 mm and 2 mm and an air-gap radius is between about 80 mm and 100 mm.

8. The traction motor of claim 7, wherein the sleeve comprises carbon fiber or Inconel.

9. The traction motor of claim 7, wherein an intermediate layer of fibers of the sleeve is arranged in an axial direction for every nine layers arranged in a circumferential direction.

10. The traction motor of claim 7, wherein the traction motor is configured to provide maximum power at a top speed of about 14,000 rpm.

11. The traction motor of claim 7, wherein the rotor further comprises rounded corners for each bridge.

12. The traction motor of claim 7, wherein the rotor further comprises a plurality of non-conductive wedges disposed in an outer center section of each rotor pole.

13. A synchronous reluctance machine, comprising:
a stator;
a rotor disposed within the stator and configured to rotate relative to the stator; and
a sleeve disposed circumferentially around the rotor, the sleeve comprising a plurality of layers of fibers arranged such that an intermediate layer of fibers is arranged in an axial direction for every one or more layers of fibers arranged in a circumferential direction.

14. The synchronous reluctance machine of claim 13, wherein the intermediate layer of fibers is arranged in an axial direction for every nine layers of fibers arranged in a circumferential direction.

15. The synchronous reluctance machine of claim 13, wherein the sleeve comprises carbon fiber or Inconel.

16. The synchronous reluctance machine of claim 13, wherein the machine is configured to provide maximum power at a top speed of about 14,000 rpm.

17. The synchronous reluctance machine of claim 13, wherein an air-gap radius is between about 80 mm and 100 mm.

18. The synchronous reluctance machine of claim 13, wherein sleeve thickness is between about 1 mm and 2 mm.

19. The synchronous reluctance machine of claim 13, wherein the rotor further comprises rounded corners for each bridge.

20. The synchronous reluctance machine of claim 13, wherein the rotor further comprises a plurality of non-conductive wedges disposed in an outer center section of each rotor pole.

* * * * *